3,534,142
METHODS OF TREATING TAPEWORM
INFECTIONS WITH NAPHTHAMIDINES
Morton Harfenist and Richard Baltzly, Scarsdale, N.Y.,
assignors to Burroughs Wellcome & Co. (U.S.A.) Inc.,
Tuckahoe, N.Y., a corporation of New York
No Drawing. Continuation-in-part of application Ser. No.
353,292, Mar. 19, 1964. This application Oct. 5, 1967,
Ser. No. 672,984
Claims priority, application Great Britain, Mar. 22, 1963,
11,555/63
Int. Cl. A61k 27/00
U.S. Cl. 424—326                    22 Claims

ABSTRACT OF THE DISCLOSURE

A method of treating tapeworm infections in mammals, which comprises administering to a mammal a therapeutically effective amount of a compound selected from the class consisting of a base of Formula I

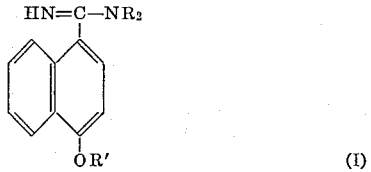

wherein R is alkyl having from 3 to 8 carbon atoms, R' is alkyl having from 1 to 11 carbon atoms, wherein both the R's attached to the nitrogen atom are the same, and in which the sum of the R's and R' is 12 to 19, and a pharmaceutically acceptable acid addition salt of Formula I.

---

This application is a continuation-in-part of U.S. application, Ser. No. 353,292, filed Mar. 19, 1964, now abandoned.

This invention relates to a method of treating tape worm infestations in mammals.

In the complete specification of U.K. Pat. No. 679,119 (U.S. Pat. No. 2,491,473) there are described and claimed substituted amidines having local anaesthetic properties and possessing the Formula I

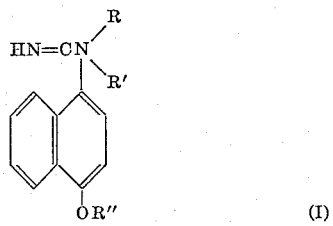

wherein R and R' are alkyl groups containing together from four to ten carbon atoms and R" is a lower alkyl group containing from one to four carbon atoms.

It has now been found that activity is shown against tapeworm (cestode) infections in mammals (as exemplified by activity against *hymenolepis nana* in the mouse) by some of the higher members of the aforementioned amidines and their acid addition salts and, also, by a number of higher novel homologous amidines and their acid addition salts as defined below. These amidines may be represented by the Formula II

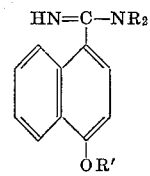

wherein R is alkyl having from three to eight carbon atoms, R' is alkyl having from one to eleven carbon atoms, preferably the sum of the carbon atoms of the R's and R' is twelve to nineteen inclusive, and wherein both the R's attached to the nitrogen are the same.

This invention, therefore, provides a method for the treatment of a tapeworm infestation, comprising the administration to a mammalian host of such infestation of an amidine of the above formula or of an acid addition salt thereof. While all of these amidines are relatively toxic on injection, the higher members are poorly absorbed and, hence, are relatively non-toxic to the host when given orally. At the same time, the toxicity to the parasites also increases to a maximum around the compounds in the middle of the class comprised in this invention. For this reason, these central members are preferred as combining lower toxicity to the host with high effectiveness against the parasites. The effectiveness of individual compounds against individual parasite species varies somewhat, so that the compound of choice against one parasite may not be that against another. Other factors to be considered are the identity of the host and, especially when large-scale treatment of animal parasites is involved, the cost of preparing the compounds.

Tapeworm infections which may be conveniently treated with an amidine or an acid addition salt thereof include *Echinococcus granulosus* in dogs, *D. mansoni* or *D. erinacci* in dogs, cats or pigs, *Monieza expansa* in sheep or cattle, *Davainea proglottina* in poultry, *Raillietina tetragona*, *R. echinobothrida* in poultry, *Taenia taeniaformis* in cats, *T. hydatigena* or *T. pisiformis* in dogs, or *T. saginata*.

Of especial interest is a tapeworm of dogs *Echinococcus granulosis*. This worm is virtually innocuous to its primary canine host, but its cysts cause much damage in the intermediate hosts—sheep, cattle and deer. In various livestock raising regions, this parasite is both a public health problem and a cause of considerable economic loss. The only effective way of dealing with it is to eliminate it from the dogs of the area.

In practice, the amidine compounds of this invention may be presented for the treatment of a tapeworm infection in the form of an orally ingestible pharmaceutical composition comprising an amidine or a salt thereof together with a therapeutically acceptable carrier therefor. An amidine in the form produced in its chemical synthesis and its solutions and suspensions in the liquids used therein is not, as such, a pharmaceutical composition as defined in this specification. The amidine or a salt thereof may be presented advantageously in discrete units such as tablets, capsules, cachets, each containing a predetermined amount of the compounds. It may be presented also as a powder or granules, as a solution or suspension in a non-aqueous or emulsified liquid.

The compositions may be made by any of the methods of pharmacy and they may include one or more of the following accessory ingredients: diluents, solutes, buffers, flavoring, binding, dispersing, surface-active, thickening, fabricating and coating materials, preservatives, antioxidants and bacteriostats, and any other acceptacle excipients.

The preferred composition for the treatment of infections of tapeworms are tablets and granules comprising an amidine of the invention or a salt thereof wherein the R's are the same. The compounds of Formula II or acid addition salts thereof are preferably orally administered in a single dose at a dose level of 1 to 400 mg. (1 to 200 being preferred) as base per kg. of mammal (i.e. dog, mouse, etc.) bodyweight. The preferred dosage for these compounds for treating Taenia pisiformis in dogs is 25 to 50 mg./kg. (as base) in a single orally administered dose, although multiple doses may be administered.

In another aspect therefore, this invention provides an orally ingestible pharmaceutical composition for the treatment of a tapeworm infection comprising an amidine as previously defined.

The anthelmintic activity of the amidine acid addition salts lies in the amidine part of the molecule and the acids may be any acid which reacts with the amidine base to give a therapeutically acceptable acid addition salt, for example: embonate, hydrochloride, hydrobromide, lactate, citrate, sulphate, succinate, oxalate, p-toluenesulphonate, 2-hydroxy-3-naphthoate or p-chlorobenzene sulphonate acid addition salts.

While the amidines can, in certain cases, be isolated as the base they are fairly strong bases having pKa in the range 11–12 and, hence, will be positively charged (that is, present as cation components of salts) under any conditions of physiological interest. If administered as bases, it would be expected that the acid gastric secretions would convert them to salts. Furthermore, since the salts are very stable while the free bases are much less so, they will by practice be handled, stored and administered as acid addition salts.

An amidine of the invention may be prepared by a method similar to the methods described in the complete specification of U.K. Pat. No. 619,659, namely by the reaction of a halomagnesium dialkylamine of the formula $R_2NMgX$ (X being a halogen atom) with the appropriate 4-alkoxy-α-naphthonitrile and hydrolyzing the product.

The initial product of the reaction mixture is the halomagnesium derivative of the amidine. This is hydrolyzed, for example, by an iced aqueous solution of ammonium chloride and the halomagnesium radical is replaced by hydrogen, so liberating the required amidine. Usually the hydrolysis product is contaminated with secondary amine which is removed by distillation in vacuo or by other conventional means (such as crystallization of the salts).

The halomagnesium radical is formed from a Grignard reagent and the appropriate secondary amine. Any Grignard reagent may be used as the Grignard hydrocarbon radical is eliminated as an inert hydrocarbon in the formation of the halomagnesium secondary amine. The halogen may be chlorine, bromine or iodine, but bromine is preferred and ethylmagnesium bromide has been found to be the most convenient reagent. These amidines may also be prepared, but in rather inferior yield, by the method of British Pat. 598,453.

The following examples illustrates the invention. All temperatures are in degrees Celsius. In Examples 10 to 13, the Nos. of 16, 20 and 100 correspond to aperture dimensions of 1130, 965 and 100μ, respectively.

EXAMPLE 1

Preparation of N,N-diamyl-4-hexyloxy-α-naphthamidine

A Grignard solution was prepared from magnesium turnings (5 g.) and ethyl bromide (22 g., 0.2 mole) in absolute ether (200 ml.) contained in a flask equipped with a stirrer, reflux condenser and dropping funnel. Di-n-amylamine (32 g.) was added to this mixture at a rate sufficient to cause gentle refluxing and after the addition was complete, the solution was refluxed for a further hour. To the refluxed solution was added an ethereal solution of 4-hexyloxy-α-naphthonitrile (38 g., 0.15 mole) over a period of 30 minutes. After the addition was complete, the reaction mixture was refluxed for 24 hours, cooled and hydrolyzed with an iced hydrochloric acid solution. A considerable amount of solid separated and was filtered off. The filtrate was extracted with ether, the extract discarded, the aqueous layer was treated with a base and extracted with ether. The ethereal extracted formed Extract I.

The solid originally obtained by filtration was dissolved in warm water, the solution then basified and extracted with benzene to form Extract II. Extracts I and II were then evaporated separately on a steam bath using, if necessary, a vacuum to remove final traces of di-amylamine. The two basic residues were then dissolved in absolute ethanol and acidified with ethanolic hydrogen chloride. Absolute ether was added until the solutions were barely turbid, after which crystallization of the amidine hydrochloride was induced by scratching. The resulting salt melted at 217–218°.

EXAMPLE 2

N,N-diheptyl-4-butoxy-α-naphthamidine hydrochloride

To a solution of ethyl magnesium bromide, prepared from magnesium turnings (3.7 g.) and ethyl bromide (16.3 g.) in anhydrous ether (200 ml.), was added di-n-heptylamine (32 g.) in dry ether (150 ml.). The solution was then refluxed for an hour and 4-butoxy-α-naphthonitrile (14.3 g.) dissolved in dry ether (250 ml.) was added gradually over one-half hour. The reaction mixture was then stirred and refluxed for 18 hours, cooled and hydrolyzed with iced saturated ammonium chloride solution. The ethereal layer was separated, washed with water and dried over anhydrous potassium carbonate. This ethereal solution of the base was then evaporated and the residue subjected to distillation at 0.03 to 0.05 mm. pressure. A portion of diheptylamine boiling at 85–93° was thus removed. The residue was dissolved in absolute ethanol, acidified with ethanolic hydrogen chloride and crystallized by addition of ether. The pure hydrochloride melted at 213–214°.

EXAMPLE 3

N,N-diheptyl-4-pentoxy-α-naphthamidine hydrochloride

This preparation was identical with that of Example 2, except that 4-pentoxy-α-naphthonitrile (22.4 g.) was added to the solution of bromomagnesium diheptylamide, and the reflux time was 19 hours. The amidine hydrochloride, purified as described in Example 2, melted at 207°.

EXAMPLE 4

N,N-dihexyl-4-butoxy-α-naphthamidine hydrochloride

To a solution of ethyl magnesium bromide (prepared as in Example 2), was added dihexylamine (17.6 g.) anhydrous ether (150 ml.). After 45 minutes refluxing, a solution of 4-butoxy-α-naphthonitrile (14.3 g.) was added and the reaction mixture was stirred and refluxed for 24 hours. After working up by the method of Example 2, the pure hydrochloride, M.P. 218–219°, was isolated.

EXAMPLE 5

N,N-dihexyl-4-hexyloxy-α-naphthamidine hydrochloride

A Grignard solution was prepared from magnesium turnings (4.85 g.) and ethyl bromide (19.7 g.) in anhydrous ether (250 ml.). To this was added a solution of di-n-hexylamine (40 g.) in anhydrous ether (220 ml.) and the solution was refluxed for one-half hour. To this was added, over a period of 10 minutes, a solution of 4 - hexyloxy-α-naphthonitrile (38 g.) in warm dry benzene (100 ml.). The reaction mixture was stirred and refluxed for 42 hours and then hydrolyzed with iced hydrochloric acid (containing 60 ml. of concentrated hydrochloric acid). A solid separated that appeared to contain the whole of the product together with some dihexylamine hydrochloride, the magnesium salts and any neutral impurities being in the filtrate and washings. The solid was shaken with sodium hydroxide solution and ether and the ethereal solution of the bases was dried over potassium carbonate and subjected to distillation in high vacuum to remove dihexylamine. The residual amidine was converted to the hydrochloride which was recrystallized from alcohol-ether mixtures and then from nitromethane, M.P. 201–202°.

EXAMPLE 6

N,N-dihexyl-4-heptyloxy-α-naphthamidine hydrochloride

This preparation was run by the same procedure as that of Example 5, except that 4-heptyloxy-α-naphthonitrile (40 g.) was used. The amidine hydrochloride, isolated by the same procedure, melted at 197–198°, after crystallization from nitromethane.

EXAMPLE 7

N,N-dioctyl-4-methoxy-α-naphthamidine hydrochloride

This compound was prepared by the method of Example 5, (using 27.5 g. of 4-methoxy-α-naphthonitrile). The amidine hydrochloride melted at 173°.

EXAMPLE 8

N,N-dibutyl-4-hexyloxy-α-naphthamidine hydrochloride

A Grignard reagent was prepared from 22 g. (0.2 M) of ethyl bromide, 5.35 g. (0.22 g-atom) of magnesium turnings ("for Grignard") and 250 ml. of commercial anhydrous ether, under a nitrogen atmosphere. To this was added, over about 10 seconds, 31.3 g. (0.234 M) of dry, carbonate-free di-n-butylamine, washing this in with about 50 ml. of anhydrous ether. The resulting mixture was stirred and heated under reflux about one hour. A solution of 47.8 g. (0.189 M) of 4-n-hexyloxy-1-naphthonitrile in about 250 ml. of hot benzene (previously dried by treatment with calcium hydride of material dried by azeotropic distillation) was then added, and the reaction mixture was heated under reflux for 19 hours. Cautious addition of 120 ml. of 6 N aqueous hydrochloric acid after this time gave a white precipitate which was filtered off and combined with the ether-benzene upper layer of the filtrate. The resulting suspension was largely dissolved by addition of ethanol, treated with 120 ml. of 6 N aqueous sodium hydroxide and extracted with ether. The ethereal solution was dried with magnesium sulfate and evaporated down, finally using a mechanical pump and steam heat to distil off dibutylamine. The residue was dissolved in a little ethanol and treated with a slight excess of a concentrated solution of hydrogen chloride in ethanol, then ethyl acetate and finally anhydrous ether to incipient turbidity. Two such crystallizations yielded 60 g. of white solid, M.P. 214–214.8°.

Analysis. Calcd. for $C_{25}H_{39}ClN_2O$, MW 419.04 (percent): C, 71.63; H, 9.38. Found (percent): C, 71.77; H, 9.00.

This compound has ben shown to clear dogs of *Dipylidium canium* and *Taenia pisiformis* in single doses of 15 mg./kg. In tests against *Echinococcus granulosis*, complete clearance was obtained at 200 mg./kg. At this dose level, no toxic symptoms whatever were observed in the dogs.

EXAMPLE 9

A tablet of N,N - diheptyl-4-butoxy-α-naphthamidine hydrochloride was made from the following:

|  | Mg. |
|---|---|
| N,N-diheptyl-4-butoxy-α-naphthamidine hydrochloride | 346 |
| Starch (potato) | 50 |
| Lactose 100# | 50 |
| Magnesium stearate | 4 |

The hydrochloride salt was mixed with the lactose and ⅔ of the starch and the mixture granulated with sufficient 2% starch mucilage made from the remainder of the starch. The moist mass was sifted through a 20# sieve and dried at 50°. The dried mass was sifted 16# and added to the remainder of the starch and the magnesium stearate sifted 100#. The equivalent of 346 mg. of the hydrochloride salt was compressed on a die to form a tablet.

EXAMPLE 10

Tablets of the following compound were made in the manner described in the preceding Example 9.

N,N-diamyl-4-hexyloxy-α-naphthamidine hydrochloride
N,N-diheptyl-4-butoxy-α-naphthamidine hydrochloride
N,N-di-n-heptyl-4-amyloxy-α-naphthamidine hydrochloride
N,N-dihexyl-4-butoxy-α-naphthamidine hydrochloride
N,N-dihexyl-4-hexyloxy-α-naphthamidine hydrochloride
N,N-dihexyl-4-heptyloxy-α-naphthamidine hydrochloride
N,N-dioctyl-4-methoxy-α-naphthamidine hydrochloride
N,N-dibutyl-4-butoxy-α-naphthamidine hydrochloride
N,N-dibutyl-4-amyloxy-α-naphthamidine hydrochloride
N,N-dibutyl-4-hexyloxy-α-naphthamidine hydrochloride

EXAMPLE 11

Dispersible powder granules of N,N-diheptyl-4-butoxy-α-naphthamidine hydrochloride were made from the following:

|  | Mg. |
|---|---|
| N,N-diheptyl-4-butoxy-α-naphthamidine hydrochloride | 90 |
| Starch (potato) | 90 |
| Magnesium stearate | 1.0 |

A mixture of the hydrochloride salt and ⅔ of the starch was granulated with sufficient 2% starch mucilage made from part of the remainder of the starch. The moist mass was sifted through a 20# sieve and dried at 50°. The dried mass was sifted 16# and added to the remainder of the starch and the magnesium stearate sifted 100#.

EXAMPLE 12

Dispersible powder granules of the amidines named in Example 10 were made in the manner described in Example 11.

EXAMPLE 13

N,N-di-n-butyl-4-decyloxy-α-naphthamidine hydrochloride

To a Grignard reagent, prepared from magnesium turnings (4.85 g.), ethyl bromide (19.7 g.) and ether (200 ml.) was added di-n-butylamine (28.1 g.) in dry ether (200 ml.). After an additional half hour of heating under reflux, the amine magnesium salt solution so produced was treated with 4 - decyloxy-α-naphthonitrile (46.6 g.) dissolved in dried benzene (100 ml.). The reaction was heated under reflux for 1.5 days and then cooled and cautiously treated with an excess of 6 N hydrochloric acid. The crystals so formed proved to be crude amidine hydrochloride contaminated with amidine hydrobromide which remained even after several recrystallizations. The salt mixture was therefore converted to the amidine base by dissolving in methanol and treating this solution with excess of 30% aqueous sodium hydroxide. This solution was then extracted with benzene and the benzene solution was dried and distilled, finally at a bath temperature of 130° and pressure 0.1 mm./Hg to remove unreacted amine. The residue was dissolved in dry ether and treated with the requisite amount of dry hydrogen chloride, and the resulting crystals recrystallized twice from acetone-ether, M.P. 196°.

*Analysis.*—Calculated (percent): C, 72.1; H, 8.63; N, 6.5. Found (percent): C, 72.03; H, 9.34; N, 6.77.

EXAMPLE 14

N,N-di-isopropyl-4-heptyloxy-α-naphthamidine

A Grignard reagent was made from magnesium turnings (4.85 g., 0.2 M) and ethyl bromide (19.7 g., 0.18 M) in commercial anhydrous ether (200 ml.) in the usual way. This was then heated under reflux for one-half hour and di-isopropylamine (0.216 M, 21.9 g.), previously dried over sodium hydroxide pellets, dissolved in dry ether (100 ml.) was added. After an additional hour of heating under reflux to ensure complete displacement of the "active" hydrogen of the amine to form the magnesium salt of the amine, 4 - heptyloxy - α - naphthonitrile (0.15 M, 40.1 g.) dissolved in dried benzene (100 ml.) was added with stirring. The reaction mixture was then stirred and heated under reflux for two days, and protected from the atmosphere by a tube containing sodium hydroxide pellets serving as a condenser vent.

To the reaction mixture was cautiously first added water (100 ml.) and then 6 N-hydrochloric acid (100 ml.). During this addition, spontaneous refluxing occurred. When the addition was completed the reaction mixture was stored at 4° overnight and then filtered, yielding a pasty solid (75 g.). A portion of this solid, after being dried on a porous plate, melted at 183–4°. To remove the water and salts, the crude solid was dissolved in methanol and made alkaline by addition of 30% aqueous sodium hydroxide (100 ml.). The resulting paste was shaken with benzene twice, causing nearly all of the solid to dissolve. The benzene solution was separated, dried over magnesium sulphate, and concentrated on a steam bath. The residual solid weighed 43.4 g. It was dissolved in anhydrous ether and cautiously treated with dry hydrogen chloride. When the maximum of precipitation had occurred, the precipitate of the named amidine hydrochloride was filtered off, essentially pure, adjudged by its melting point of 203°. Four recrystallizations from water by addition of aqueous hydrochloric acid to incipient turbidity at ca. 100° followed by cooling, gave hydrochloride salt, melting point 206°.

*Analysis.*—Calculated (percent): C, 71.16; H, 9.21; Cl⁻, 8.75. Found (percent): C, 70.72; H, 8.95; Cl⁻, 8.59.

EXAMPLE 15

N,N-di-n-butyl-4-octyloxy-α-naphthamidine hydrochloride

Di-n-butylamine (387 g. 3 moles) and anhydrous aluminium chloride (201 g., 1.5 moles) were mixed in a three-litre flask. After the moderate heat of reaction had subsided, there was added solid 4-octyloxy-α-naphthonitrile (281 g.) which dissolved readily in the warm reaction mixture. The flask was protected from the atmosphere by a capillary outlet and was heated on the steam bath for three hours. At the end of that time, the reaction mixture was poured into iced 3 N hydrochloric acid (2 litre) with constant stirring. The precipitated amidine hydrochloride was filtered off, washed with cold 3 N hydrochloric acid and recrystallized from hot water to give N,N-dibutyl-4-octyloxy-α-naphthamidine hydrochloride, M.P. 197–198°, identical with the material prepared by the method of Example 2.

EXAMPLES 16 to 25

The following compounds, in the form of their hydrochloride salts, were prepared in the manner described in Examples 13 and 15. The melting points are given in degrees Celsius.

Ex. 16.—N,N-di-n-propyl-4-heptyloxy-α-naphthamidine hydrochloride, 203–203.5°.

Ex. 17.—N,N - di-n-butyl-4-heptyloxy-α-naphthamidine hydrochloride, 205°.

Ex. 18.—N,N - di - n - propyl - 4 - octyloxy - α-naphthamidine hydrochloride hemihydrate, 205°.

Ex. 19.—N,N - di - isopropyl - 4 - octyloxy - α-naphthamidine hydrochloride, 210°.

Ex. 20.—N,N - di - n - propyl - 4 - nonyloxy - α-naphthamidine hydrochloride, 206–207°.

Ex. 21.—N,N - di - n - butyl - 4 - nonyloxy - α-naphthamidine hydrochloride, 199°.

Ex. 22.—N,N - di - n - propyl - 4 - decyloxy - α-naphthamidine hydrochloride, 195–196°.

Ex. 23.—N,N-di-isopropyl-4-decyloxy-α-naphthamidine hydrochloride hydrate, 186–187°.

Ex. 24.—N,N - di - n - propyl - 4 - undecyloxy - α-naphthamidine hydrochloride, 186–187°.

Ex. 25.—N,N - di - isopropyl - 4 - undecyloxy - α-naphthamidine hydrochloride, 180–181°.

What is claimed is:

1. A method of treating tapeworm infections in mammals, which comprises orally administering to said infected mammal a nontoxic antitapeworm amount of a compound selected from the group consisting of a base of formula

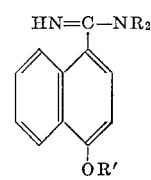

wherein R is alkyl having from 3 to 8 carbon atoms, R' is alkyl having from 1 to 11 carbon atoms, wherein both the R's attached to the nitrogen atom are the same, and in which the sum of the R's and R' is 12 to 19, and a pharmaceutically acceptable acid addition salt of said base.

2. A method according to claim 1, wherein the compound is administered at a dosage of 1 to 200 mg. calculated as base per kg. of mammal bodyweight.

3. A method according to claim 1, in which R is amyl and R' is hexyl.

4. A method according to claim 1, in which R is heptyl and R' is butyl.

5. A method according to claim 1, in which R is heptyl and R' is pentyl.

6. A method according to claim 1, in which R is hexyl and R' is butyl.

7. A method according to claim 1, in which R is hexyl and R' is hexyl.

8. A method according to claim 1, in which R is hexyl and R' is heptyl.

9. A method according to claim 1, in which R is octyl and R' is methyl.

10. A method according to claim 1, in which R is butyl and R' is hexyl.

11. A method according to claim 1, in which R is butyl and R' is butyl.

12. A method according to claim 1, in which R is butyl and R' is amyl.
13. A method according to claim 1, in which R is butyl and R' is decyl.
14. A method according to claim 1, in which R is isopropyl and R' is heptyl.
15. A method according to claim 1, in which R is butyl and R' is octyl.
16. A method according to claim 1, in which R is propyl and R' is heptyl.
17. A method according to claim 1, in which R is butyl and R' is heptyl.
18. A method according to claim 1, in which R is propyl and R' is octyl.
19. A method according to claim 1, in which R is propyl and R' is nonyl.
20. A method according to claim 1, in which R is butyl and R' is nonyl.
21. A method according to claim 1, in which R is propyl and R' is decyl.
22. A method according to claim 1, in which R is propyl and R' is undecyl.

References Cited

UNITED STATES PATENTS 2,491,473  12/1949  Baltzly et al. _____ 260—564
3,290,375  12/1966  Harfenist et al.

ALBERT T. MYERS, Primary Examiner

H. M. ELLIS, Assistant Examiner